2,933,405

DEXTRAN-SULFITE LIQUOR SOLIDS ADHESIVES

Everett E. Witt, Dayton, and Frederick W. Holt, Jr., Troy, Ohio, assignors to The Commonwealth Engineering Company of Ohio, Dayton, Ohio No Drawing. Application June 18, 1956
Serial No. 591,801

2 Claims. (Cl. 106—123)

This invention relates to new adhesive compositions. More particularly, the invention relates to compositions based on waste sulfite liquor solids as the primary binder and having adhesive properties.

Waste sulfite liquor solids have been used as an adhesive. However, the known compositions based on those solids are not entirely satisfactory adhesives from the viewpoint of water-resistance, tack, "grab," and the range of viscosities obtainable by mixing the solids with water or aqueous media.

The object of this invention is to provide new compositions the primary adhesive constituent of which is composed of waste sulfite liquor solids but which have improved characteristics as compared to the solids per se and the known compositions comprising them.

This and other objects are accomplished by the present invention which provides new, improved adhesives comprising waste sulfite liquor solids and, as modifier, a selected dextran or mixture of selected dextrans, with or without the inclusion of plasticizers.

The dextrans comprise a group of polysaccharides which can be obtained by the action on sucrose of selected bacteria such as those of the Leuconostoc mesenteroides and L. dextranicum types or of the enzyme dextransucrase produced by the bacteria.

At present, ninety-six dextrans have been investigated by the Starch and Dextrose Section, Northern Utilization Research Branch, Peoria, Ill., and designated by a numeral identifying the strain of bacteria cultivated to produce the enzyme, preceded by the letters NRRL B–. The constant feature of these dextrans is their structural component which appears to be almost exclusively the anhydroglucopyranosidic unit of alpha-configuration. The 1,6-glucosidic linkages constitute from 50% to 97% of the total linkages.

It is found, in accordance with this invention, that specific dextrans having special characteristics have the capacity, when incorporated in adhesive compositions the primary binder of which is waste sulfite liquor solids, to enhance the properties, and hence the usefulness, of the compositions. The special dextrans which have this capacity are characterized by maximum molecular linearity as indicated by a high alpha-1,6 to non-1,6 repeating glucosidic ratio. Specifically, in these selected dextrans 86% to 97% of the glucosidic linkages are 1,6 linkages. The dextrans used in the present composition are further characterized in that they form stable aqueous solutions of at least 10% concentration, either by merely mixing with water, or by such expedients as the application of heat to facilitate the dissolution or by gradually working water into the particulate dextran so that each particle becomes dispersed in its own dense paste and then adding water to the desired fluidity. An additional characteristic of the selected dextrans, and a requirement for the present purposes, is that aqueous 10% solutions thereof have, at room temperature, viscosities in the range 30 to 200,000 centipoises determined with the Brookfield viscometer. Mixtures of two or more specifically different dextrans which mixtures, in 10% aqueous solution, have viscosities in the stated range, may be used.

Typical dextrans which meet the present requirements include the following NRRL types: B–512, –1397, –641, –742, –1064, –1119, –1382, –1383, –1308, –1394, –1255 and –1407.

The molecular weight of the dextran obtained by inoculating a sucrose-containing nutrient medium with a whole culture of the selected bacterium, or with the enzyme separated from the culture, may depend on the percent sucrose in the nutrient. Thus, at 10% sucrose levels the molecular weight of the dextran formed and precipitated from the fermentate is extremely high, estimated in the millions. At higher sucrose concentrations such as 20% the molecular weight of the dextran while still high as compared to that of other organic materials, is sometimes lower than the molecular weight of dextran produced in the media made up with the smaller sucrose concentrations. The native dextrans produced under conditions of varying sucrose levels, and otherwise meeting the aforesaid specifications, may be used in the practice of this invention.

In some cases, also, the dextran is structurally heterogeneous and can be separated into dextrans belonging in different classes ranging from readily or ultimately water-soluble dextrans meeting the present viscosity requirements to water-insoluble dextrans the insolubility of which increases progressively with increase in the content of non-1,6 linkages. Such dextrans as may be obtained by fractionation of a structurally heterogeneous dextran before or after isolation from the fermentate and which can be dissolved in water to give 10% solutions of the viscosity indicated may also be used in preparing the present adhesive compositions. Dextrans which are structurally heterogeneous include those designated as NRRL B–1142, –1192, –1255, –1351, and –1374.

Dextran partial hydrolyzates which meet the present requirements and obtained by hydrolyzing native dextran to segments of lower molecular weight may be used, also.

If the other requirements are met, the dextran may have a molecular weight between 20,000 and that of native dextran.

The selection of the dextran, or of mixtures of dextrans, to be used in formulating the new compositions depends on the characteristics desired for the adhesive compositions. An extremely wide choice is possible so that adhesive compositions adapted to a wide variety of uses under different sets of conditions are made available by the present invention.

In preparing the instant compositions, the particulate selected dextran and particulate waste sulfite liquor solids may be blended or milled together in any suitable device to produce powders which retain their free-flowing properties at relative humidities as high as 95%. The proportion of the selected dextran component used in preparing these dry powders is from 5% to 10% by weight. The dry powders may be marketed and mixed with water prior to use.

Liquid adhesive compositions according to the invention may be compounded for marketing as such, by preparing a 5% to 10% aqueous solution of the selected dextran and then adding the water-soluble waste sulfite liquor solids slowly to the dextran solution at room temperature and with continued stirring.

The dextrans having properties as disclosed hereinabove are completely compatible in the waste sulfite liquor solids formulations in concentrations of 5% to 10% by weight on the combined dextran and solids weights and are more compatible therein than are various other substances that have been proposed as adjuvants or modifiers in the waste liquor solids adhesives.

Plasticizers may be incorporated in the compositions in amounts of about 5% by weight. In formulating the wet liquid adhesives, the plasticizer may be added to the aqueous dextran solution before or after introduction of the waste liquor solids.

Examples of solid plasticizers which may be used include urea, thiourea, sodium nitrate, sodium thiocyanate, potassium thiocyanate, potassium nitrate, calcium chloride, magnesium chloride, zinc chloride, sodium lactate, sodium acetate and sorbitol.

Examples of liquid plasticizers that may be used include glycerine, ethylene glycol, diethylene glycol and propylene glycol.

The following typical formulations based on the waste solids and L. m. B–512 native dextran are given as illustrative of the new adhesive compositions.

|  | Parts by weight |
|---|---|
| (1) Water | 100 |
| Sulfite solids | 95 |
| Dextran | 5 |
| (2) Water | 100 |
| Sulfite solids | 90 |
| Dextran | 5 |
| Glycerin | 5 |
| (3) Sulfite solids | 95 |
| Dextran | 5 |
| (4) Sulfite solids | 90 |
| Dextran | 5 |
| Sorbitol | 5 |

The dextrans having the properties stated have the effect of increasing the viscosity of the wet adhesives containing the sulfite solids as primary binder, in the presence or absence of a plasticizer. The influence of the dextran on the viscosity of the sulfite solids adhesive formulations is shown in Table I below. The formulations were prepared containing 50% total solids and the viscosities in centipoises were determined with a Brookfield viscometer using a No. 3 spindle, at 20 r.p.m. The viscosities of formulations A and B should be compared with those for products C and D made up with the sulfite solids but not containing the dextran.

Table I

| Formulation, Percent of Total Solids | Centipoises at 81° F. | |
|---|---|---|
|  | No Plasticizer | 5% glycerin |
| A. Sulfite solids | 95 | 530 | 400 |
| Dextran (86–97% 1,6 linkages) | 5 | | |
| B. Sulfite solids | 90 | 1,210 | 810 |
| Dextran (86–97% 1,6 linkages) | 10 | | |
| C. Sulfite solids | 100 | 120 | |
| D. Sulfite solids | 95 | | 90 |

The selected dextrans also have an important up-grading influence on the water-resistance of the compositions. The water-resistance of these adhesives after application of the aqueous solutions to a base and drying is considerably better than that of the known adhesives based on the sulfite solids. This is surprising, since dextran is a highly hydroxylated substance which would not be expected to impart water-resistance to the compositions.

An increase in the water-resistance is obtained in the presence or absence of a plasticizer.

The water-resistance was tested by the following procedure:

To obtain the data for items A and B of Table II below the dextran-modified compositions were applied as a thin film to No. 60 coated, lithograph paper. The film was dried in the air for 24 hours. The paper was then cut into segments 4" x 2.75" to insure a uniform surface area of the segments. The segments were dried in an oven at 110° C. and weighed on an analytical balance. They were then submerged in water at 20° C. for exactly 10 seconds, re-dried at 110° C. for one hour, and weighed to determine the amount of adhesive dissolved from the surfaces. The amounts are given in grams in Table II.

The data for items C and D were obtained in the same way and should be compared with those for items A and B.

Table II

| Formulation, Percent of Total Solids | Adhesive Dissolved | |
|---|---|---|
|  | No plasticizer | 5% glycerin |
| A. Sulfite solids | 95 | 0.0206 | 0.0205 |
| Dextran (86–97% 1,6 linkages) | 5 | | |
| B. Sulfite solids | 90 | 0.0141 | 0.0181 |
| Dextran (86–97% 1,6 linkages) | 10 | | |
| C. Sulfite solids | 100 | 0.0266 | |
| D. Sulfite solids | 95 | | 0.0194 |

On testing these dextran-modified adhesives proved to have excellent tack superior to that obtainable with either dextran or the sulfite solids alone, and "quick grab." The latter term refers to the rapidity of bonding between two substrates at least one of which is coated with the adhesive composition, when the adhesive is moistened and the two substrates are pressed together.

These new compositions are remoistenable to adhesive condition. That is to say, the compositions may be applied to paper or any other suitable substrate, dried in the air or by any suitable means, and subsequently activated to adhesive condition by moistening. Thus paper, for example, wallpaper, may be coated with the adhesive composition, the latter dried to a non-tacky firmly adherent film, and the paper rolled upon itself without blocking and subsequently unrolled, the dry adherent film moistened to adhesive condition, and the paper hung. Those dextrans in the group or class defined herein which may be dissolved in water under conditions as by heating, or by first dispersing the dextran in water by working the water in gradually to allow all of the dextran particles to become dispersed in their own dense paste, and then adding water to the desired fluidity, such as NRRL B–1254 native dextran, for instance, are especially water-resistant under ordinary conditions. Such water-resistance enhances the value of those dextrans as modifiers in the compositions to be used as remoistenable adhesives.

Dextrans, or at least some of them, have been found to have adhesive properties and adhesive compositions based on such dextrans may be used for purposes for which a high degree of water-resistance, tack and "quick grab" are not required. However, such dextran-based adhesives do not have the viscosity range, water-resistance, tack, or "grab" of the present compositions in which the dextran is a minor component and is essentially a modifier for the sulfite solids as is shown by comparative tests. It appears that, in combination, the sulfite solids and selected dextran or mixture of selected dextrans, act on one another in some manner to yield the improved adhesive compositions.

The compositions of the invention are generally useful adhesives. For some industrial uses, the compositions may be modified in various respects, for instance by the inclusion of small amounts (up to 5% by weight based on the composition weight) of pigments and/or of inert fillers such as finely ground mica, ground silica (quartz) and ground glass.

The sulfite waste liquors from which the solids are recovered are obtained, for example, as waste liquor in the pulping of wood by the sulfite process. Such liquors usually contain 80–90% of solid matter consisting principally of lignin. The solids may be separated by known procedures and used as base in preparing the present compositions.

Some changes and modifications may be made in the compositions as specifically discussed herein, for instance in the selection of the particular dextran component and plasticizer used. Such changes can be made without departing from the spirit and scope of the invention and therefore it will be understood that it is not intended to limit the invention except as defined in the appended claims.

What is claimed is:

1. A dry powder adhesive composition adapted to be admixed with water to provide an aqueous adhesive solution, said dry composition consisting essentially of the following constituents by weight; 5% of a plasticizer selected from the group consisting of glycerine and sorbitol, 50% of waste sulfite liquor solids which solids constitute 90% to 95% of said waste sulfite liquor, 5% to 10% of dextran, said dextran being of the *Leuconostoc mesenteroides* strain and designated NRRL B-512 and having 86% to 97% of the glucosidic linkages in the 1,6 position and having a molecular weight between 20,000 and that of native unhydrolyzed dextran, said composition providing a water resistant tough adhesive.

2. A powder adhesive composition as in claim 1 and wherein said sulfite solids constitute 90% weight of the powdered adhesive, and dextran 5% by weight and wherein the plasticizer consists of 5% by weight, and said dry powder adhesive being admixed with 100 parts by weight of water to provide a liquid adhesive composition.

References Cited in the file of this patent

UNITED STATES PATENTS

| | | |
|---|---|---|
| 1,221,259 | Woddrop | Apr. 3, 1917 |
| 1,848,981 | Wallace | Mar. 8, 1932 |
| 2,457,357 | Fenn | Dec. 28, 1948 |
| 2,542,344 | Mersereau | Feb. 20, 1951 |
| 2,671,779 | Gaver et al. | Mar. 9, 1954 |
| 2,768,096 | Toulmin | Oct. 23, 1956 |